UNITED STATES PATENT OFFICE.

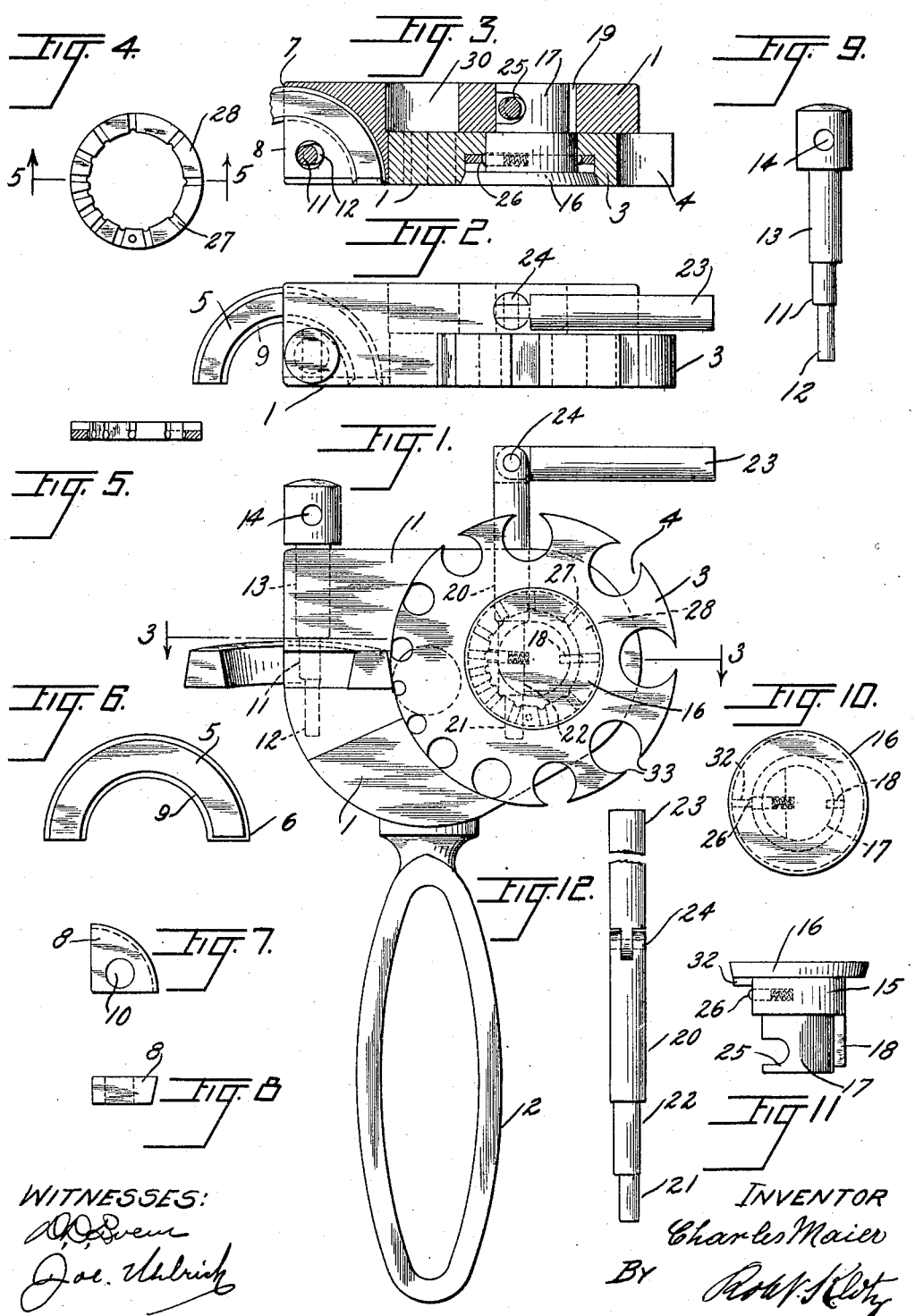

CHARLES MAIER, OF CHICAGO, ILLINOIS.

LATHE-TOOL.

1,056,429.   Specification of Letters Patent.   Patented Mar. 18, 1913.

Application filed May 11, 1912. Serial No. 696,605.

*To all whom it may concern:*

Be it known that I, CHARLES MAIER, a subject of the Emperor of Germany, and a resident of Chicago, Illinois, have invented certain new and useful Improvements in Lathe-Tools, of which the following is a specification.

The essential object of this invention is to provide a tool or device adapted to be used in connection with a lathe by which metal is turned, in order to provide means by which the article being operated upon by the lathe may be turned or cut to any desired diameter, and to incorporate into one tool devices by which it may be used for turning many articles, each of a different diameter.

In the drawings, Figure 1 is a front view or elevation of the tool completely assembled and ready for operation; Fig. 2 is a top plan view; Fig. 3 is a section on the line 3—3, Fig. 1; Fig. 4 is an elevation of the member by which the rotatable plate is locked in position; Fig. 5 is a section on the line 5—5, Fig. 4; Fig. 6 is a top plan view of the cutting tool; Fig. 7 is a top plan view and Fig. 8 is an end or side view of the member which locks the cutting tool, shown in Fig. 6, in position; Fig. 9 is an elevation of the pin or member which controls the device shown in Figs. 7 and 8; Fig. 10 is an elevation and Fig. 11 is a top plan view of part of the means for locking the rotatable plate in position; and Fig. 12 is an elevation of the lever by which the locking mechanism is controlled.

The device comprises a base 1 upon which all movable parts are mounted. The base is a piece of metal or a casting, and a handle 2 is secured thereto. In the base 1 are sundry recesses, perforations, and the like as will hereinafter more clearly appear.

The rotatable plate 3 is provided with perforations or openings 4, each of which is of a different size or diameter, and is adjacent the periphery of plate 3.

The cutting tool 5 is retained within the base 1 so as to present its cutting edge 6 adjacent the periphery of plate 3. The cutter 5 is preferably circular or crescent-like in shape so that it may be fed forward as the cutting edge 6 becomes dulled. The cutter 5 is retained within a cut-out portion or recess 7 in the base 1, the wall of said recess conforming in shape to the tool 5, which is wedge-shaped in cross section. The wedge or block 8 is adapted to bear against the inner wall 9 of tool 5 and press same tightly against the grooved wall of the recess 7, thus to lock tool 5 firmly in place. Said wedge or block 8 is perforated at 10 and the cylindrical stud 11 upon the pin shown in Fig. 9 is received within said perforation. Said pin is made in three sections, 11, 12, and 13, all of which are cylindrical in shape. Parts 12 and 13 are in axial alinement but part 11 is eccentric to parts 12 and 13. Said parts 12 and 13 are journaled in perforations in the base 1, but when said pin is revolved part 11 causes the wedge 8 to bear tightly against the cutter 5 and thereby locks the cutter fixedly in any desired position. By putting a key (not shown) into the perforation 14 in the head of the pin, the pin can be turned in either direction desired and the cutter 5 locked or unlocked at will.

The member shown most clearly in Figs. 10 and 11 of the drawings, acts as a journal or bearing upon which the plate 3 is adapted to rotate. Said member comprises a cylindrical surface 15, a flange 16, which is shaped like a truncated cone, and a stud 17 provided with a spline 18 which projects through the perforation 19 in the base 1. The pin shown in Fig. 12 is provided with two concentric cylindrical portions 20 and 21 and with a cylindrical portion 22 eccentric to portions 20 and 21. Said pin is journaled in perforations provided therefor in the base 1 and can be turned back or forth by the lever 23 pivoted thereto at 24. The part 22 is received within the recess 25 in the stud 17; hence, when the lever is turned in the proper direction the eccentric 22 bears upon the wall of the perforation 25 and forces the member shown in Figs. 10 and 11 toward the rear, Fig. 1, and toward the top, Figs. 2 and 3. The wedge-like flange 16 thus bears heavily upon the plate 3 and forces same tightly against the base 1, thus locking the plate 3 upon the base 1 and holding same against rotation.

The journal 15 carries a spring-controlled dog 26 which is adapted to seat in the notches 27 found upon the ring 28. Said ring, which is shown in detail in Figs. 4 and 5, is secured to the rotatable plate 3 and the various recesses 27 are arranged radially, one of said recesses pointing at 110 each perforation 4. When the tooth or dog 26 seats in any recess 27 it holds the plate 3 locked in such position that the desired perforation 4 is exactly opposite the cutting edge 6 of the cutter 5. In the rear of the base 1 is the perforation or recess 30.

When it is desired to use the tool, the plate 3 is rotated until the perforation 4 of the size corresponding with the diameter of the article to be turned or ground, is presented to the cutter 5. The metal to be turned is then clamped tightly in the rotatable chuck or spindle of the lathe (not shown). The non-rotatable head or end of the lathe is then moved so that the conical point thereof projects within the aperture or perforation 30, and then the metal to be turned or cut has its end brought to a point where it rests against the cutting edge 6. The chuck being rotated, the metal to be cut is likewise rotated and is cut by the tool 5, and this process is continued until the metal has been turned down sufficiently so as to pass through the particular perforation 4 which is in juxtaposition to the cutter 5.

It is possible by the use of this tool to cut such an article as the pin shown in Fig. 9. The block or chunk of metal out of which such a pin would be formed, would be rotated with its outer edge against the cutting edge 6 of the tool 5 until such time as the whole piece of metal had been turned down to the thickness of the part marked 13, which end would be attained by turning the plate 3 to the point where that particular perforation 4 which corresponds in diameter to part 13 is opposite the cutter 5, for, as any piece of metal is turned or cut that end which is first cut or turned, will pass into and be received within one of the perforations 4, though it cannot pass into such perforation until the turning process has been continued long enough.

In order to cut the part 11 of the pin shown in Fig. 9, plate 3 will be rotated until a perforation 4 of a different size was presented to the cutter 5, and so on.

The ring 28 is fixed to the member 3 in such position that the notches 27 are faced toward the flange 16. Said flange bears a feather 32 which is adapted to seat within one of the notches 27 whenever the plate 3 is to be clamped in position. The dog 26 will keep said plate from turning except when the operator so desires, but will not be strong enough to hold the plate in position when the grinding operation is in progress.

As will appear from Fig. 1 of the drawings, the apertures 4 are circular in shape but are placed at the periphery of said member 3 so as to leave openings 33 through which the metal is being turned is presented to the cutter 5.

It should be understood that as the chuck which carries the metal to be operated upon is being rotated, the back-rest is fed forward from time to time by any suitable means, thus pressing the stud or cone on the rear end or back-rest of the lathe into the recess 30; and in this way the whole tool is retained between the fixed and the movable heads of the lathe, and the tool and rotatable chuck are caused to approach each other as the cutting process progresses.

The cutter 5 may have its end flush with the face of the revolving plate, as shown in Fig. 3, or it may be projected downwardly for some distance in front of the plate and thus the metal which is being operated upon will have a cone-like end cut thereupon.

Obviously, many changes in details of construction and arrangement of parts may be made without departing from the scope of the invention or of the various claims.

I claim as my invention:

1. A tool comprising a base provided with a recess adapted to be engaged by the fixed head of a lathe, a cutter mounted in said base, a movable member, the edge of which is adapted to be presented to the cutting edge of said cutter, said movable member being provided with circular perforations adjacent its edge, a member seated in the base upon which said movable perforated member is journaled, a flange upon said member which is seated in said base, and means to cause said flange to bear upon said perforated member, thereby to lock the same in fixed position.

2. A tool comprising a base provided with a recess adapted to be engaged by the fixed head of a lathe, a cutter mounted in said base, a movable member, the edge of which is adapted to be presented to the cutting edge of said cutter, said movable member being provided with circular perforations adjacent its edge, a member seated in the base upon which said movable perforated member is journaled, a flange upon said member which is seated in said base, and an eccentric adapted to lock the same in fixed position.

3. A tool comprising a base, a revoluble plate provided with a plurality of circular peripheral perforations, a journal upon which said plate rotates, a flange secured to said journal and adapted to bear against said rotatable plate, means to force said flange into engagement with said plate, and a cutter, the edge of which is adjacent the edge of said rotatable plate.

4. A tool comprising a base, a rotatable plate journaled thereupon, said plate being provided with circular peripheral perforations, a ratchet in connection with said plate, means co-acting with said ratchet and adapted to lock said plate against rotation, and a cutting tool, the edge of which closely approaches the edge of said rotatable plate.

5. A tool comprising a base, a cutter adjustably mounted thereupon, a circular plate provided with peripheral perforations, each of which is adapted to be presented to said cutter, said base being provided with a recess on the side opposite to said circular plate, a member co-acting with said plate and projecting into said recess, and a key adapted to engage said member which projects into said recess and thereby lock said plate in fixed position.

6. A tool comprising a base, a cutter adjustably mounted thereupon, a circular plate provided with peripheral perforations, each of which is adapted to be presented to said cutter, said base being provided with a recess on the side opposite to said circular plate, a member co-acting with said plate and projecting into said recess, and a key provided with an eccentric portion adapted to co-act with the member projecting into said recess, said key being mounted in said base, thereby to lock said plate in fixed position.

7. A tool comprising a base, a rotatable plate journaled thereupon, said plate being provided with circular periphery perforations, a ratchet in connection with said plate, a member provided with an eccentric portion, means co-acting with said eccentric portion adapted to lock said plate against rotation, means co-acting with said ratchet, said means also being adapted to lock said plate against rotation, and a cutting tool, the edge of which closely approaches the edge of said rotatable plate.

8. A tool comprising a base, a rotatable plate provided with circular peripheral perforations, a member upon which said plate is journaled, said member being movable transversely of said plate and said member bearing a recess, a member mounted in the base and revoluble therein, said member being provided with an eccentric portion received within the recess upon said journaled member, and a cutting tool, the cutting edge of which closely approaches the edge of said rotatable plate.

In testimony whereof I have hereunto affixed my name in the presence of two witnesses.

CHARLES MAIER.

Witnesses:
P. B. JUHNKE,
ROBT. KLOTZ.

---

Copies of this patent may be obtained for five cents each, by addressing the "Commissioner of Patents, Washington, D. C."